United States Patent [19]

Herzl

[11] 4,062,238
[45] Dec. 13, 1977

[54] MULTI-RANGE VORTEX-TYPE FLOWMETER

[75] Inventor: Peter J. Herzl, Morrisville, Pa.

[73] Assignee: Fischer & Porter Company, Warminster, Pa.

[21] Appl. No.: 768,416

[22] Filed: Feb. 14, 1977

[51] Int. Cl.² .............................................. G01F 1/32
[52] U.S. Cl. .............................. 73/194 VS; 73/272 R
[58] Field of Search ........................ 73/194 VS, 272 R

[56] References Cited

U.S. PATENT DOCUMENTS 4,003,253  1/1977  Yard et al. ............................. 73/194

Primary Examiner—Herbert Goldstein

[57] ABSTRACT

A flowmeter of the vortex type in which an obstacle assembly mounted in a flow tube causes vortices to be shed at a frequency that is a function of flow rate. The assembly includes a block fixedly mounted across the flow tube at right angles to the direction of flow, the block having a predetermined geometry whose cross-section is uniform throughout its length. Fitting over the front face of the block is a replaceable adapter cap having a channel therein which conforms to the profile of the block and acts as a socket therefor. The formation of the adapter cap is such as to effectively expand the cross-section of the block without altering the geometric configuration thereof whereby the resultant expanded block restricts the effective area in the flow tube of fluid passing by the block, thereby making it possible to measure flow rates below the normal operating range of the meter.

5 Claims, 6 Drawing Figures

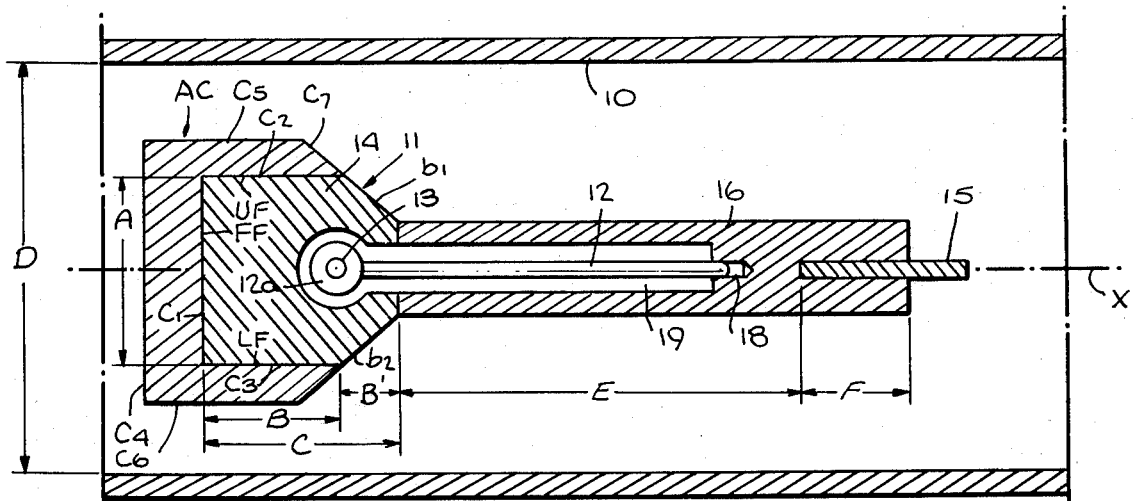
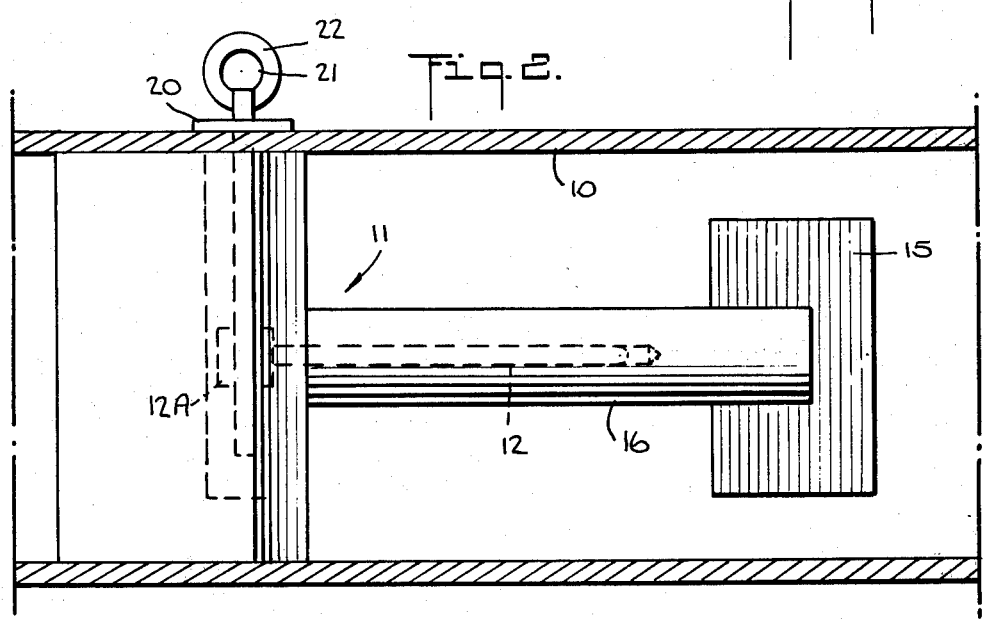
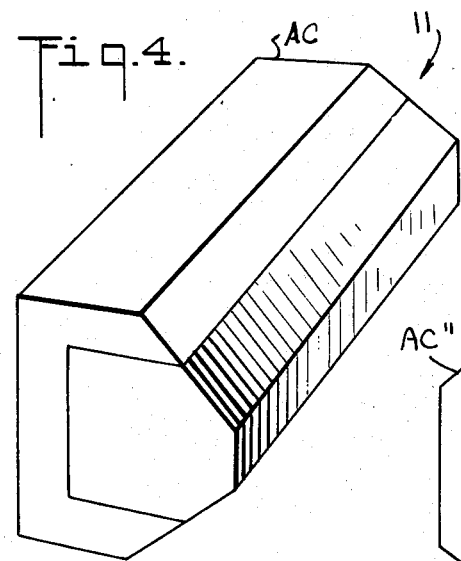
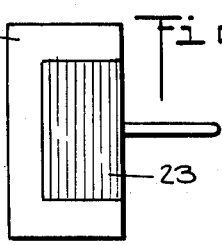
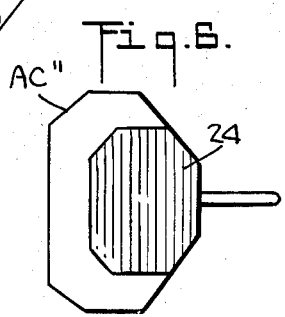
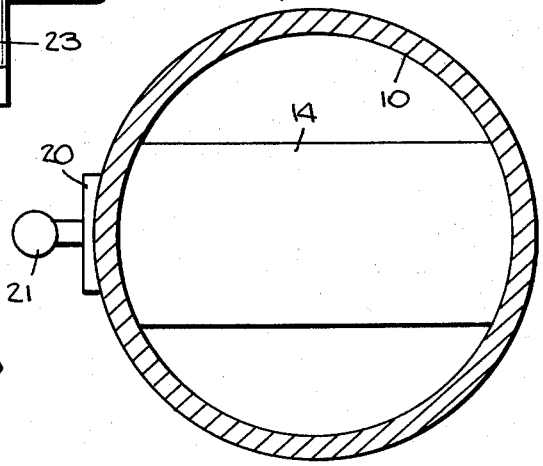

MULTI-RANGE VORTEX-TYPE FLOWMETER

BACKGROUND OF INVENTION

This invention relates generally to flowmeters of the vortex type, and more particularly to an adapter cap for the shedding body of a flowmeter acting to reduce the effective area of the fluid passing by the body without altering the geometry of the body, thereby making it possible to measure flow rates below the normal operating range of the meter.

It is well known that under certain circumstances the presence of an obstacle in flow conduit will give rise to periodic vortices. For small Reynolds numbers, the downstream wak is laminar in nature, but at increasing Reynolds numbers, regular vortex patterns are formed. These patterns are known as Karman vortex streets. The frequency at which vortices are shed in a Karman vortex street is a function of flow rate, this phenomenon being exploited to create a flowmeter. Flowmeters of the vortex-shedding type are disclosed in U.S. Pat. Nos. 3,116,639 and 3,572,117, among others.

U.S. Pat. No. 3,589,185 described an improved form of vortex-type flowmeter wherein the signal derived from the fluidic oscillation is relatively strong and stable to afford a favorable signal-to-noise ratio, insuring accurate flow-rate information over a broad range. In this meter, an obstacle assembly is mounted in the flow tube, the assembly being constituted by a block positioned across the tube with its longitudinal axis at right angles to the direction of fluid flow, a strip being similarly mounted across the conduit behind the block and being spaced therefrom to define a gap which serves to trap Karman vortices and to strengthen and stabilize the vortex street. This street is sensed by a pressure or other form of transducer to produce an electrical signal whose frequency is proportional to flow rate.

A conventional vortex-shedding flowmeter has a fixed metering range within which it is capable of accurately measuring flow rate. This range is largely determined by linearity requirements, signal recovery parameters and internal velocity limitations.

In some instances, it becomes necessary to accurately measure low flow velocities which lie below the normal operating range of a standard vortex-type meter. With existing meters, it is not possible, in the field, to alter the operating range of an installed meter. Moreover, it is difficult to produce a small capacity flowmeter, for with existing vortex-shedding meter structures, the vortex-sensing system cannot economically be miniaturized.

In the copending application of Yard, et al, Ser. No. 611,170 filed Sept. 8, 1975, there is disclosed an adapter for a standard vortex-shedding flowmeter. This adapter, when applied to the meter, renders it capable of measuring low flow velocities below the normal operating range thereof, the adapter acting to restrict the effective area of fluid traversing the vortex-shedding body, whereby for the same velocity of flow past the shedding body, a smaller amount of fluid is metered.

A significant feature of the Yard, et al invention is that by means of adapters of different size one can readily change the operating range of the meter in the field without, however, adversely affecting the linearity of the meter.

In the Yard, et al arrangement, the adapter is constituted by a pair of rods which are inserted longitudinally into the flow tube on opposite sides of the vortex-shedding block mounted transversely across the tube. These rods act to restrict the effective area of the fluid traversing the block whereby for the same velocity of flow past the block, a smaller amount of fluid is metered.

The Yard, et al arrangement presents certain practical difficulties. Thus there is the problem of supporting the adapter rods within the flow tube so that they conform to the internal wall of the flow tube and yet can be readily withdrawn from the tube. Second, there is the problem raised by the shape of the shedding body, for the inserted rods are only effective with certain shedder shapes.

SUMMARY OF INVENTION

In view of the foregoing, the main object of this invention is to provide an adapter for a vortex meter which renders the meter capable of measuring low flow velocities below the normal operating range thereof.

More specifically, it is an object of this invention to provide an adapter of the above-noted type in the form of a cap which is receivable on a vortex shedding body disposed within a flow tube, the cap serving to enlarge the effective cross-sectional area of the body without altering its geometry, thereby restricting the flow passage through the tube and changing the capacity of the meter.

A significant feature of the invention is that by means of adapter caps of different size, one can readily change the operating range of the meter in the field without, however, adversely affecting the linearity of the meter.

Apart from lowering the meter capacity, the adapter cap offers another major advantage, for the basic flowmeter can be designed with a narrow shedding body, resulting in better operation and a lower pressure drop at high fluid velocities, whereby when the cap is added, the meter is then converted into a low fluid velocity measuring instrument.

This multi-range operating mode is especially attractive in larger vortex type flowmeters, for when the cost of installing a line-sized meter is unduly high, it may be economically feasible to install a smaller meter capable of measuring the fluid at the higher meter velocities with an acceptable pressure drop. On the other hand, when a line-sized meter is installed, fluid velocities are usually relatively low and a different set of optimum characteristics is required.

The use of cap adaptors in accordance with the invention affords an additional fringe benefit, for if the fluids being measured are highly abrasive and tend to erode the surface of the obstacle body, caps can be changed when necessary to recondition the flowmeter. Moreover, one may provide adapter caps whose abrasion resistance is greater than that of the obstacle body, thereby prolonging the life of the meter.

Briefly stated, these objects are attained in a flowmeter in which an obstacle assembly mounted in a flow tube includes a block positioned across the tube at right angles to the direction of flow, the front face of the block being presented to the incoming fluid whereby vortices are shed thereby to produce fluidic oscillations at a frequency proportional to flow rate.

The block has a predetermined geometry whose cross-sectional area is uniform throughout its length. Fitting over the face of the block is a removable adapter cap having a channel which conforms to the geometry of the block and acts as a socket therefor. The formation of the cap is such as to effectively expand the cross-sectional area of the block without altering the geometric configuration thereof, whereby the resultant expanded block restricts the effective area on the flow tube of fluid passing by the block, thereby making it possible to measure flow rates below the normal operating range of the meter.

By the use od caps of different size which are mountable on the block to incrementally expand its effective cross-sectional area, a multi-range meter may be provided.

OUTLINE OF DRAWING

For a better understanding of the invention as well as other objects and further features thereof, reference is made to the following detailed description to be read in conjunction with the accompanying drawings, wherein:

FIG. 1 is a longitudinal section taken through a vortex flowmeter including an obstacle assembly having an adapter cap in accordance with the invention;

FIG. 2 is a section taken through the meter in the plane indicated by line 2—2 in FIG. 1;

FIG. 3 is a front view of the meter;

FIG. 4 separately illustrates, in perspective, the block included in the obstacle assembly on which the adapter cap is mounted;

FIG. 5 illustrates an adapter cap for a block of different geometry; and

FIG. 6 illustrates an adapter cap for a block of still another shape.

DESCRIPTION OF INVENTION

In the vortex-type flowmeter of the type disclosed in the Herzl U.S. Pat. 3,867,839, there is provided an obstacle assembly adapted to generate strong stabilized fluidic oscillations causing a deflectable section of the assembly to vibrate at a corresponding rate. These mechanical vibrations are sensed to produce a signal whose frequency is proportional to the flow rate of the fluid. In the flowmeter disclosed in this patent, the mechanical vibrations are sensed by one or more strain gauges mounted within the deflectable section to produce periodic changes in electrical resistance, resulting in a signal whose frequency is proportional to the vibratory rate and hence to the flow rate of the fluid.

The basic flowmeter illustrated in FIGS. 1 to 4 is of the type described in greater detail in the Herzl and Stroheimer patent application, Ser. No. 758,849 filed Jan. 12, 1977 entitled "Obstacle Assembly for Vortex Type Flowmeter" in which the vibrations of a deflectable section of the obstacle assembly are detected by a force sensor which is external to the flow tube. It is to be understood, however, that while the invention is illustrated in an external sensor arrangement in order to show how the obstacle assembly provides adequate space for a sensing system, in its broadest aspect, the invention, which is primarily concerned with the geometry of the obstacle assembly, is applicable to internal as well as external sensor arrangements for vortex type flowmeters and to vortex meters with other sensing expedients, such as thermistors, pressure sensors, etc.

FIGS. 1 to 4 illustrate a basic flowmeter having an obstacle assembly on which is mounted an adapter cap AC in accordance with this invention, the meter including a flow tube 10 interposed in the water line for a waterflood system or in any other environment in which it is necessary to conduct an occasional test of flow rate to determine whether proper flow conditions exist. For this purpose, the flow tube may be provided with end flanges to facilitate coupling to the line.

Mounted within flow tube 10 is an obstacle assembly generally designated by numeral 11, the assembly including a deflectable section which is responsive to the Karman vortex street and is caused to vibrate microscopically at a frequency which is proportional to flow rate. Incorporated in the obstacle assembly is a vibration transmitter composed of a rod 12 and a probe 13.

Flow tube 10, which is shown as having a circular cross-section, includes an inlet into which the fluid to be metered is introduced. The flow impinges on obstacle assembly 11 which acts to divide the flow around the obstacle, producing fluidic perturbations in the form of a Karman vortex street. Obstacle assembly 11 is constituted by a transversely-mounted front section 14 in the form of a block and a rear section 15 mounted behind the front section by a cantilever support in the form of a flexible beam 16.

Front section 14 is a block having a generally square cross-section which is uniform throughout the long axis of the block, this axis being perpendicular to the flow axis X of the flow tube. The extremities of the front section are secured to the wall of the tube whereby the front section is held fixedly within the tube. Rear section 15 is constituted by a rectangular vane which is maintained by beam 16 in spaced relation to the front section, the plane of the vane being parallel to the flat upper and lower faces of front section block 14.

Because rear section 15 is cantilevered by means of flexible beam 16, it is deflectable. The beam, though bendable, has sufficient rigidity so as to permit only a slight deflection of the rear section. As a consequence of the fluidic oscillations produced within the flow tube, the deflectable rear section 15 is excited into vibration at a rate corresponding to the frequency of the oscillations.

The natural resonance of the deflectable rear section is such as to be well outside the normal frequency range of the meter whereby mechanical resonance peaks are absent and the amplitude of the vibrating motion accurately reflects the amplitude of the fluidic oscillations. The downstream vane section of the assembly carried out two functions, for this section which interferes with the wake not only stabilizes it to enhance its detectability, but its vibratory motion gives rise to the output signal.

Because the deflectable system is relatively rigid, the total excursion of the rear section is minute even at the highest amplitudes of fluidic oscillation, so that metal fatigue of the supporting beam, as a result of the vibrating action, is minimized and failures do not arise after prolonged operation.

It is important to note that the magnitude of deflection is not of primary importance, for the flow rate information is given by the frequency, not the amplitude of vibration. Hence while the deflection magnitude is made extremely small in order to provide an acceptable fatigue life, this does not militate against a readable output of varying frequency.

The minute vibrations of the deflectable rear section of the obstacle assembly are sensed outside of flow tube 10 rather than within the tube. For this purpose, the vibrations are conveyed by the vibration transmitter, including rod 12, whose rear portion is socketed within a bore 18 within beam 16, the bore extending to a point adjacent deflectable section 15. The front portion of rod 12 lies freely within a relatively large diameter, longitudinally-extending bore 19 communicating with the smaller diameter bore 18 and extending well into front section 14.

Rod 12 terminates in a collar 12A which encircles the end portion of probe 13 to provide a link between the rod and the probe. Probe 13 extends through a longitudinal passage in front section 14 and projects through an opening in the wall of flow tube 10 which is covered by a flexible diaphragm 20, probe 13 terminating in a coupling head 21.

Any force sensor 22 capable of responding to a force developed at coupling head 21 to produce a corresponding electrical signal may be used to provide a signal indicative of flow rate. A preferred sensor for this purpose is quartz piezoelectric load cell, such as the "Piezotron" load cell (922 series) manufactured by Kistler Instrument Company of Redmond, WA. This is a very stiff, rugged force sensor responsive to minute incremental forces and usable in environments contaminated by dust, dirt or moisture without any adverse effect on signal transmission.

An obstacle body having a square cross-section is a mechanically efficient shape and provides sufficient internal volume to accommodate the rod and probe for transmitting the vibrations to an external sensing point. But a square cross-sectional shape affords a poor shedding action. As noted in the above-identified co-pending Herzl and Stroheimer application, when the block is modified in the manner shown in FIGS. 1 and 4, the shedding characteristics are significantly altered and the body becomes a superb shedder. This shedder is particularly advantageous in small vortex-type flowmeters (1 to 8 inch internal diameter).

This modification will now be explained. The front section block having a square cross-section is provided with a flat front face FF which has a height A, a flat rear face RF and flat upper and lower faces UF and LF, respectively.

Front face FF is presented to the incoming fluid stream, and rear face RF is parallel thereto, the two faces being at right angles to the direction of flow. The distance between front face FF and rear face RF is represented by symbol C, and this distance is about equal to height A. The rear corners of block 14 are bevelled, the upper and lower bevels $b_1$ and $b_2$ lying within a rear zone B' which is about one-third the distance C, so that the front zone B which encompasses the upper and lower flat face is two-thirds distance C.

The angle of bevels $b_1$ and $b_2$ is not critical and may be in the range of about 45 to 60°. As a consequence, the area of rear face RF is small compared to the area of front face FF. The size of height A of the block relative to the internal diameter D of the flow tube is not critical and lies in the range of about 0.15 to 0.35. The distance E along beam 16 between rear face RF of the block and the leading edge of vane 15 is about 1 to 1½ D, whereas the width F of vane 15 is about one-fourth the wavelength of the shedding frequency.

As indicated in the copending Herzl and Stroheimer application, with a shedding arrangement having the geometric relationships set forth hereinabove, meter linearities of better than ± 1% can be achieved at Reynolds numbers as low as 7,000. Because the A to D relationship is not critical, this allows much greater freedom in meter optimization.

Cap AC which is mounted over the front face FF of the block 14 has a channel therein which conforms to the geometry of the block and acts as a socket therefor. Thus the base $C_1$ of the cap matches front face FF of the block and the sides $C_2$ and $C_3$ match the upper and lower faces UF and LF of the block.

The formation of cap AC is such as to effectively expand the cross-sectional area of block 14 without altering its geometric configuration. Thus the front face $C_4$ of the cap is parallel to front face FF of the block, the upper and lower faces $C_5$ and $C_6$ of the cap are parallel to the upper and lower faces UF and LF of the block whereas the rear bevels $C_7$ and $C_8$ of the cap have the same angle and lie in the same plane as rear bevels $b_1$ and $b_2$ of the block. By mounting the cap on the block, the geometric form and advantages of this shedding body are maintained, but the effective area of the flow passage between flow tube 10 and this body is reduced in size, making it possible for the meter to measure flow rates below its normal operating range.

In practice, the cap may be secured to the block by screws or other removable means so that the cap may be replaced, when worn by abrasive fluids, by a fresh cap of the same size. Or the cap may be replaced by another cap which also maintains the geometry of the block but which provides a different degree of fluid restriction to render the meter operative in a different range.

The invention is by no means limited to adapter caps of a block whose geometry is of the type shown in FIGS. 1 and 4 and is applicable to other obstacle block forms which lend themselves to expansion without change in geometric configuration. Thus FIG. 5 shows a block 23 having a rectangular cross-section whose cross-sectional area is expanded by an adapter cap $AC^1$ which maintains this geometric form but restricts the flow passage, to lower the range of the vortex meter containing this obstacle.

FIG. 6 shows still another form of obstacle body 24 which has a generally rectangular cross-section and is bevelled both at the front and rear, the adapter cap AC″ in this instance has a channel which conforms to the shape of block 24 and enlarges its effective cross-sectional area without altering its geometric configuration.

While there has been shown and described preferred embodiments of a multi-range vortex-type flowmeter in accordance with the invention, it will be appreciated that many changes and modifications may be made therein without however departing from the essential spirit thereof.

I claim:

1. In combination with a flowmeter of the vortex type in which an obstacle mounted in a flow tube includes a block fixedly mounted across the tube at right angles to the direction of fluid flow, the front face of the block being presented to the incoming fluid, said block having a predetermined geometric configuration whose cross-sectional area is uniform through its longitudinal axis, a replaceable adapter cap fitting over the front face of the block, said cap having a longitudinal channel therein which conforms to the profile of the block and acts as a socket therefor, said cap having a formation effectively expanding the cross-sectional area of the block without altering its geometric configuration whereby the resultant expanded block restricts the effective area in the flow tube of the fluid passing by the block, thereby making it possible to measure flow rates below the normal operating range of the meter in the absence of the cap.

2. In a combination as set forth in claim 1, wherein said block has a generally rectangular cross section with bevelled rear carriers, said cap having rear bevels on either side of said channel whose angles correspond to those of said block bevels.

3. In a combination as set forth in claim 1, wherein said cap is made of a material which is more highly resistant to abrasion than the material of said block.

4. In a combination as set forth in claim 1, wherein said assembly further includes a vane mounted behind said block and cantilevered therefrom by a flexible beam.

5. In a combination as set forth in claim 1, wherein said block has a rectangular cross-sectional area and said adapter cap enhances said rectangular cross-sectional area.

* * * * *

UNITED STATES PATENT OFFICE
CERTIFICATE OF CORRECTION

Patent No. 4,062,238   Dated December 13, 1977

Inventor(s) Peter J. Herzl

It is certified that error appears in the above-identified patent and that said Letters Patent are hereby corrected as shown below:

Column 1, line 13 before "flow" insert -- a --

Column 1, line 15 "wak" should have read -- wake --

Column 1, line 23 "described" should have read -- describes --

Column 3, line 5 "od" should have read -- of --

Column 4, line 42 "carried" should have read -- carries --

Claim 1, line 2 before "mounted" -- assembly -- should have been inserted.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks